(12) United States Patent
Sekine et al.

(10) Patent No.: US 7,526,199 B2
(45) Date of Patent: Apr. 28, 2009

(54) OPTICAL TRANSMISSION EQUIPMENT PREVENTING MALFUNCTION IN RECOVERY FROM FAULT

(75) Inventors: Kenro Sekine, Fuchu (JP); Junya Kosaka, Yokohama (JP); Tadashi Matsuoka, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 469 days.

(21) Appl. No.: 11/184,996

(22) Filed: Jul. 20, 2005

(65) Prior Publication Data

US 2006/0018659 A1 Jan. 26, 2006

(30) Foreign Application Priority Data

Jul. 20, 2004 (JP) ............... 2004-211518

(51) Int. Cl.
*H04B 10/00* (2006.01)
*H04B 10/02* (2006.01)
*H04B 10/08* (2006.01)
*H04J 14/02* (2006.01)

(52) U.S. Cl. ............... 398/33; 398/38; 398/94; 398/158; 398/177

(58) Field of Classification Search .............. 398/33, 398/37, 38, 91–95, 157–160, 177
See application file for complete search history.

(56) References Cited

U.S. PATENT DOCUMENTS 5,815,295 A * 9/1998 Darcie et al. ............ 398/72
5,986,800 A * 11/1999 Kosaka ............... 359/341.41
6,931,213 B2 * 8/2005 Desurvire ............... 398/175
7,233,741 B2 * 6/2007 Ishizuka et al. ............. 398/48
7,248,799 B2 * 7/2007 Faure et al. ............... 398/38

FOREIGN PATENT DOCUMENTS

| JP | 05-206945 | 8/1993 |
|----|-----------|--------|
| JP | 2001-217778 | 8/2001 |
| JP | 2002-057635 | 2/2002 |
| JP | 2003-110585 | 4/2003 |
| JP | 2004-015084 | 1/2004 |

OTHER PUBLICATIONS

Evaluating Open Fiber Control, Ken Herrity, IEEE 802.3 HSSG Plenary Meeting Albuquerque.NM Mar. 7-9, 2000.
Link Signaling Sublayer (LSS) Proposal Osamu Ishida et al, IEEE p802.3aw Interim Meeting, New Orleans, LA Sep. 12-14, 2000.

* cited by examiner

*Primary Examiner*—Dalzid Singh
(74) *Attorney, Agent, or Firm*—Antonelli, Terry, Stout & Kraus, LLP.

(57) ABSTRACT

An optical transmission apparatus includes a demultiplexer for separating wavelength-division multiplexing light received from a first optical transmission line into signals of different wavelengths to transmit the signals to an outside and a multiplexer for multiplexing signals of different wavelengths received from the outside to transmit multiplexed signals to a second optical transmission line. An input check unit is provided for monitoring a power level of a signal separated by the demultiplexer and for providing an output indicative thereof. An output adjuster is provided for intercepting a signal from the outside so as to inhibit receipt of the signal from the outside by the multiplexer depending on the output of the input check unit.

7 Claims, 12 Drawing Sheets

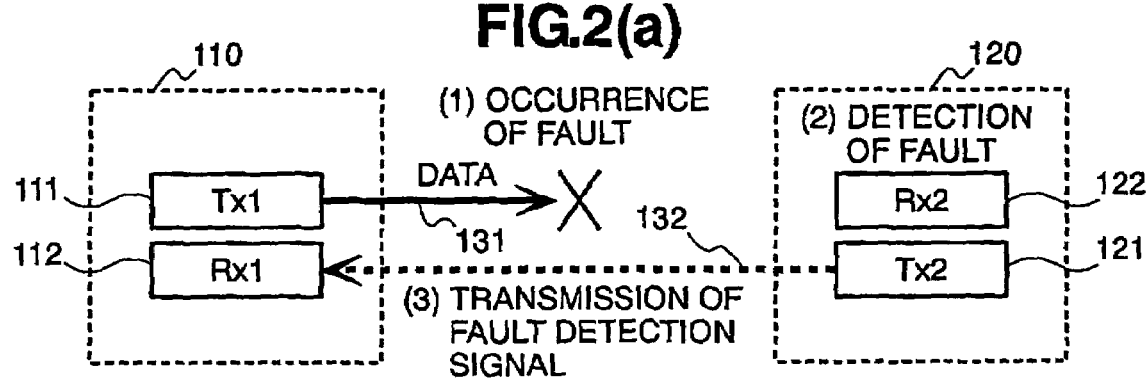
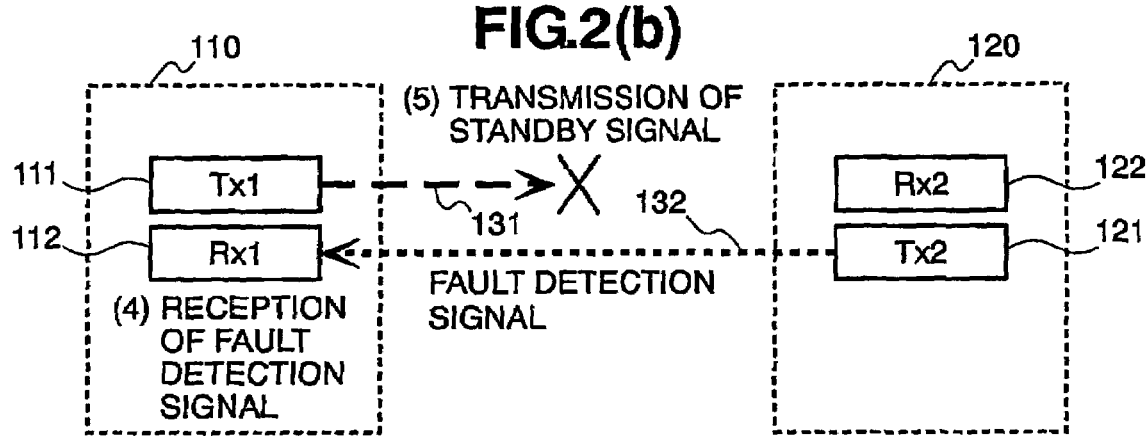
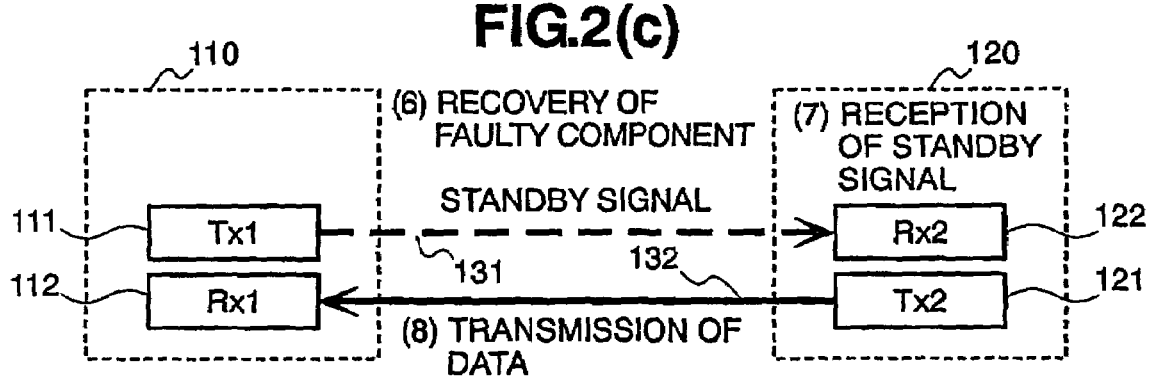
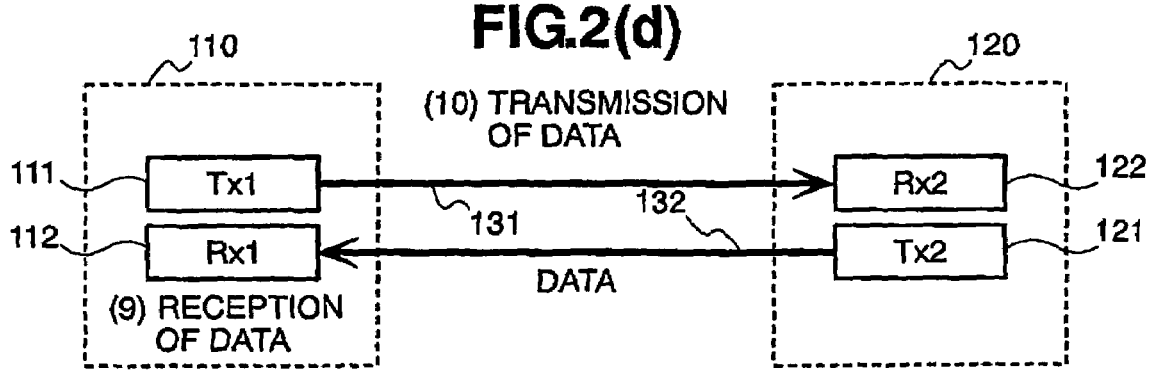

OCCURRENCE OF FAULT

RECOVERY OF FAULTY COMPONENT

OPTICAL TRANSMISSION EQUIPMENT PREVENTING MALFUNCTION IN RECOVERY FROM FAULT

BACKGROUND OF THE INVENTION

1. Field of the Invention

The present invention relates to optical transmission equipment, and more particularly, to optical transmission equipment that prevents malfunction derived from communication of fault information between transceivers.

2. Description of Related Art

In the past, optical transmission systems have been designed on the assumption that audio signals are transmitted over a trunk line including multiple telephone lines, and requested to provide super-reliable, very long-distance, and high-definition performance. On the other hand, there is a demand for low-cost data transmission targeted on base-to-base communication in a firm or interconnection between local area networks (LANs). An optical transmission system designed for the low-cost data transmission has been demanded and actively introduced. The data transmission techniques are based on the Ethernet technology. The specifications for optical transceivers concerning the products and characteristics of the optical transceivers are made public so that products of a plurality of optical transceiver manufacturers will be compatible with one another. Moreover, when a plurality of vendors provide devices, modules, and pieces of equipment, a low-cost system can be realized. Some optical transceiver manufacturers apply unique specifications to their optical transceivers.

The related art of the present invention will be described in conjunction with FIG. 1 to FIG. 5. FIG. 1 is a block diagram explanatory of the configuration of a conventional bidirectional optical transmission system. FIG. 2 is an explanatory diagram concerning actions to be performed in the conventional bidirectional optical transmission system in case a fault takes place. FIG. 3 is a state transition diagram explanatory of a fault notification facility to be included in a conventional optical transceiver. FIG. 4 is a sequence diagram explanatory of the fault notification facility of the conventional optical transceiver. FIG. 5 is a state transition diagram explanatory of another fault notification facility to be included in the conventional optical transceiver.

FIG. 1 shows the configuration of a bidirectional optical transmission system employing two-conductor optical fibers. An optical transceiver 110 comprises an optical transmitter 111 and an optical receiver 112, and an optical transceiver 120 comprises an optical transmitter 121 and an optical receiver 122. The optical transceiver 110 and optical transceiver 120 are linked by two-conductor optical fibers 131 and 132. Thus, optical transmission between two points is realized.

Now, a case where a fault takes place on one of the communication links included in the bidirectional optical transmission system shown in FIG. 1 will be discussed below. If the optical fiber 131 is broken or if the optical fiber 131 is incorrectly coupled to the optical receiver 122, the optical receiver 122 cannot receive any optical signal. However, since the communication link of the optical fiber 132 is held intact, no problem occurs in reception by the optical receiver 112. Therefore, although the fault has occurred, the optical transceiver 110 is unaware of the occurrence of the fault.

In general, optical transceivers are designed so that if a fault occurs, a special signal will be transmitted in addition to data that should be conveyed. Referring to FIG. 2, transfer of signals in case of a fault will be described. In FIG. 2(a), for example, if a fault occurs on the optical fiber 131, the optical receiver 122 detects the fault. In FIG. 2(b), the optical transmitter 121 initiates transmission of a first fault notification signal (hereinafter called a fault detection signal), which signifies that a fault has been detected, to the optical receiver 112. When the optical receiver 112 detects the fault detection signal, the optical transceiver 110 recognizes occurrence of the fault. Furthermore, the optical receiver 120 having detected interception of a signal recognizes that both the remote transmitter 111 and local receiver 122 have detected the fault. Moreover, the optical receiver 110 having detected the fault detection signal recognizes that both the local transmitter 111 and remote receiver 122 have detected the fault. Thus, the optical transceivers 110 and 120 can locate a faulty component.

Moreover, the optical transceiver 110 having received the fault detection signal must suspend data transfer because the fault has occurred downstream the local optical transmitter 111. On the other hand, the optical transmitter 111 must continuously transmit a certain signal so that immediately after the faulty component linking the optical transmitter 111 and optical receiver 122 is recovered to enable communication, the fact that the faulty component is recovered can be recognized. Therefore, a signal other than the fault detection signal, which signifies that data transfer is suspended because the fault detection signal has been detected and a standby state is under way (hereinafter called a standby signal), is adopted as a second fault notification signal. This method is widely adopted. After the optical receiver 112 detects the fault detection signal as shown in FIG. 2(b), the optical transmitter 111 suspends data transfer and transmits the standby signal instead.

FIG. 2(C) shows a state established immediately after the faulty component is recovered. Since the faulty component is recovered, the optical receiver 122 detects the standby signal. When the standby signal is detected, the optical transmitter 121 resumes data transmission. In FIG. 2(d), when the optical receiver 112 receives data instead of the fault detection signal, the optical transmitter 111 resumes data transmission.

As mentioned above, the optical transceiver 110 and optical transceiver 120 that are opposed to each other check occurrence of a fault and locate a faulty component. When recognizing that the faulty component has recovered, the optical transceivers resume bidirectional data communication.

When the foregoing change in the state of an optical transceiver is summarized, it is plotted like the state transition diagram of FIG. 3. The normal state is state 0 in which data is transmitted. In this state, if an optical transceiver detects a fault, the optical transceiver changes the state thereof into state 1 and transmits the fault detection signal. In state 1 or state 0, if the optical transceiver receives the fault detection signal, it changes the state thereof into state 2 and transmits the standby signal. In state 1 or state 0, if the optical transceiver receives data or the standby signal, it returns to state 0 and resumes data transmission.

Referring to the state transmission diagram, a procedure to be followed by optical transceivers in case a fault takes place and a procedure to be followed thereby after a faulty component is recovered will be described in conjunction with the sequence diagram of FIG. 4. In FIG. 4(a), if a fault occurs, the optical transceiver 120 detects the fault, changes states from state 0 to state 1, and transmits the fault detection signal. Thereafter, the optical transceiver 110 detects the fault detection signal, changes states from state 0 to state 2, and transmits the standby signal.

In FIG. 4(b), after the faulty component is recovered, the optical transceiver 120 detects the standby signal. The optical transceiver 120 then changes states from state 1 to state 0 and resumes data transmission. The optical transceiver 110 then detects data, changes states from state 2 to state 0, and resumes data transmission.

An example of a facility for detecting a fault and recovering a faulty component, there is, for example, a fault notification facility to be adapted to the Ethernet having a throughput of ten gigabits per second. The Institute of Electrical and Electronic Engineers of the U.S. has stipulated as a standard IEEE802.3ae the specifications for the fault notification facility for the 10 Gbps Ethernet. This document reads "detection of a local fault" in place of "DETECTION OF FAULT" described in FIG. 3, reads "transmission of a remote fault signal" in place of "TRANSMISSION OF FAULT DETECTION SIGNAL" described in FIG. 3, reads "reception of the remote fault signal" in place of "RECEPTION OF FAULT DETECTION SIGNAL" described in FIG. 3, reads "transmission of an idle signal" in place of "TRANSMISSION OF STANDBY SIGNAL" described in FIG. 3, reads "reception of data or the idle signal" in place of "RECEPTION OF DATA OR STANDBY SIGNAL" described in FIG. 3, and describes that a faulty component is located and recovered according to the same mechanism.

The fault detection facility that uses two signals of the fault detection signal and standby signal has been described so far. Improvement of safety using the fault detection facility has been discussed in many aspects. Referring to FIG. 2(b), the optical transmitter 111 continues transmission of a standby signal until a faulty component is recovered. Conceivable as the cause of the fault is the failure of the optical transmitter 111 or optical receiver 122, of the breakage or incorrect coupling of the optical fiber 131. Except the case where the optical transmitter 111 has failed, the standby signal may be released as an optical signal to a space outside equipment during a period during which a fault takes place or work of recovering a faulty component is in progress. As a means for minimizing the adverse effect of the release of the optical signal to the space outside equipment, a technique of suppressing the optical power of the standby signal has been proposed.

For example, a document, "Evaluating Open Fiber Control" (Ken Herrity, [online], September, 2000, IEEE802.3ae 10 Gb/s Task Force Plenary Meeting, [retrieved on June, describes a technique for the 10 Gbps Ethernet for suppressing a means optical power by intermittently transmitting a standby signal. FIG. 5 is a state transition diagram concerning the technique. When a fault detection signal is received, an optical transceiver changes the state thereof into state 2. The standby signal is then transmitted. If data or the standby signal is not received for a certain period of time (T1), a faulty component is recognized not to have been recovered. The optical transceiver then changes the state thereof into state 3. In state 3, transmission of the standby signal is suspended because there is a possibility that light is released to the space outside equipment over a downstream optical fiber (optical output is intercepted). However, as long as state 3 persists, when the faulty component is recovered, an opposite transceiver cannot receive the standby signal. Consequently, communication cannot be resumed. Therefore, the optical transceiver returns to state 2 again after elapse of a certain period of time (T2) and transmits the standby signal. As long as the faulty component is not recovered, the state of the optical transceiver continuously changes between state 2 and state 3. Optical powers are evened between an on period (T1) during which light is propagated and an off period (T2) during which light is intercepted. For example, if the T1 and T2 values are equal to each other, a mean optical power is a half of an original optical power. If the T2 value is nine times larger than the T1 value, the mean optical power is suppressed to be a one-tenth of the original optical power.

In FIG. 5, even if a data signal or the standby signal is received in state 3, state 3 is not changed to state 0. This is because after the standby signal is transmitted in state 2, since no response is returned within the certain period of time (T1), negotiation or handshaking is thought to be reset at the same time when a transition is made to state 3.

Moreover, Japanese Unexamined Patent Application Publication No. 2001-217778 describes a method adopting as a standby signal a signal whose duty factory is small (short pulse train) and a technique for suppressing the power of the standby signal itself by employing a signal whose level or power itself is low. This method or technique refers to a case where a special signal whose power itself is different from that of a data signal or a fault detection signal is adopted as the standby signal to be transmitted in state 2 shown in the state transition diagram of FIG. 3.

Japanese Unexamined Patent Application Publication No. 05-206945 describes an optical transceiver effective in extending the service life of a light-emitting device by disabling the light-emitting device from working when the absence of a main signal in two directions is found by monitoring the level of a received signal.

Japanese Unexamined Patent Application Publication No. 2004-015084 describes wavelength-division multiplexing transmission equipment that prevents a deadlock from occurring between transponders.

Japanese Unexamined Patent Application Publication No. 2003-110585 describes an Ethernet terminal that detects occurrence of a fault on a transmission line between terminals interconnected over the Ethernet and that even when disconnecting a link with an opposite terminal, does not notify the opposite terminal of the fact.

Japanese Unexamined Patent Application Publication No. 2002-057635 describes optical signal monitoring equipment that when receiving a fault notification signal contained in an optical signal sent from upstream equipment, intercepts optical output to associated downstream equipment.

Problems the present invention attempts to solve will be described in conjunction with FIG. 6 to FIG. 8. FIG. 6 is a block diagram of a wavelength-division multiplexing system having optical transceivers and pieces of wavelength-division multiplexing transmission equipment interconnected. FIG. 7 and FIG. 8 are sequence diagrams explanatory of a fault notification facility of each optical transceiver.

In order to realize transmission of a larger throughput using an Ethernet optical transceiver, the use of the optical transceiver in combination with wavelength-division multiplexing (WDM) transmission equipment would prove effective. The WDM is a method of combining a plurality of optical signals having different wavelengths, and transmitting the optical signals over a single optical fiber. In the WDM, as the number of wavelengths to be multiplexed gets larger, a total transmission throughput increases proportionally. This permits an optical fiber to exhibit a large data-carrying capacity.

When wavelength-division multiplexing transmission equipment and an optical transceiver are interconnected, the wavelengths of light to be transmitted by the optical transceiver are limited as described below. First, the bandwidth of light to be transmitted by the wavelength-division multiplexing transmission equipment is limited depending on the bandwidth of light to be transmitted over an optical fiber or the bandwidth of light to be amplified by an optical amplifier for long-distance transmission. Moreover, when the number of wavelengths to be multiplexed is increased, the difference between adjacent wavelengths gets smaller. This brings about a crosstalk between signals. Therefore, the wavelength of each signal must be strictly managed in the order of nanometers. As for the wavelength of each signal, any of specific wavelengths set in the form of, generally a "grid" is adopted. On the other hand, the wavelengths of signals to be transmitted by an optical transceiver that does not support wavelength-division multiplexing, such as, a general Ethernet optical transceiver are defined in the specifications for the optical transceiver to encompass an error of several tens of nanometers or more. Consequently, when the Ethernet transceiver is directly connected to the wavelength-division multiplexing transmission equipment, the crosstalk is intensified and the band use efficiency is deteriorated. At the worst, even reception may be hard to do.

When an optical transceiver that does not support wavelength-division multiplexing transmission (that does not manage wavelengths in the order of nanometers) must be connected to wavelength-division multiplexing transmission equipment, a device called a transponder is connected between the optical transceiver and wavelength-division multiplexing transmission equipment in order to realize a configuration like the one shown in FIG. 6. Wavelength-division multiplexing transmission equipment 141 comprises a multiplexer 142 that multiplexes a plurality of wavelengths and a demultiplexer 143 that separates a signal, which has wavelengths multiplexed, into signals of different wavelengths. The wavelength-division multiplexing transmission equipment 141 is opposed to wavelength-division multiplexing transmission equipment 151, which has the same components as the wavelength-division multiplexing transmission equipment 141, by way of optical fibers 131 and 132. A transponder 113 is interposed between an optical transceiver 110 and the wavelength-division multiplexing transmission equipment 141. The transponder 113 comprises a transmission transponder 114 that converts a signal received from an optical transmitter 111 into a signal to be subjected to wavelength-division multiplexing, and a reception transponder 115 that converts a signal received from the wavelength-division multiplexing transmission equipment 141 to a signal that can be received by the optical transceiver.

An optical signal sent from the optical transmitter 111 included in the optical transceiver 110 is transferred to the transmission transponder 114 included in the transponder 113, and converted into a signal that has any of wavelengths managed in the form of a grid (managed in the order of nanometers) and that is supported by the wavelength-division multiplexing transmission equipment. The optical signal having the wavelength thereof converted falls on the multiplexer 142 included in the wavelength-division multiplexing transmission equipment 141. The optical signal is then combined with other optical signal, whereby a wavelength-multiplexed signal is produced. The wavelength-multiplexed signal propagates along the optical fiber 131, and then reaches a demultiplexer 153 included in the wavelength-division multiplexing transmission equipment 151. The wavelength-multiplexed signal is then separated into signals of different wavelengths. The separated optical signals are transferred to the reception transponder 125 included in the transponder 123, converted into signals supported by an optical transceiver, and then received by the optical receiver 122.

Even on the opposite side of the system, an optical signal sent from the optical transmitter 121 is received by the optical receiver 112 via the transponder 124, multiplexer 152, optical fiber 132, demultiplexer 143, and transponder 115. Thus, when a transponder in which wavelengths are managed for the purpose of wavelength-division multiplexing is interposed between an optical transceiver in which wavelengths are not managed, such as, an Ethernet transceiver and wavelength-division multiplexing transmission equipment, transmission of a large throughput (Ethernet-based wavelength-division multiplexing transmission) can be realized inexpensively.

Moreover, some transponders have a loading facility for performing encoding that is intended for error detection or error correction, signal addition that is adapted to a control signal to be transferred between transponders, or reshaping or reproduction of a wave. When this kind of transponder is employed, a certain delay time is produced between a received signal and a transmitted signal.

In the system having the configuration shown in FIG. 6, when the optical transceiver 110 and optical transceiver 120 perform fault notification according to different state transition diagrams, that is, when the optical transceiver 120 performs fault notification according to the state transition diagram of FIG. 3 and the optical transceiver 110 performs fault notification according to the state transition diagram of FIG. 5, malfunction may occur at the time of starting up the optical transceiver 110. This phenomenon will be described below.

FIG. 7 shows a recovery sequence to be followed when one of the optical transceivers that are included in the configuration shown in FIG. 6 and connected opposite to each other, that is, the optical transceiver 110 is rebooted (restarted). FIG. 7 also shows the state of the transmission transponder 114 connected to the optical transmitter 111. For brevity's sake, the description of the actions of the reception transponder 125, opposite transmission transponder 124, and opposite reception transponder 115 will be omitted.

When the optical transceiver 110 is rebooted, the opposite optical transceiver 120 detects a fault, changes states from state 0 to state 1, and transmits a fault detection signal to the optical transceiver 110. When the rebooting of the optical transceiver 110 is completed, the fault detection signal transferred from the opposite transmitter is received. The optical transceiver 110 changes the state thereof into state 2, and transmits a standby signal to the optical transceiver 120.

Assume that a delay occurs in the transmission transponder 114 after reception of the standby signal until transmission thereof. If a delay in transmission of the standby signal occurs in the transmission transponder 114, the optical receiver 120 delays by the delay time in detecting the standby signal and returning to state 0. Consequently, the optical transceiver 110 delays in receiving a data signal. At this time, before the data signal reaches the optical transceiver 110, if a certain period of time T1 described in conjunction with the state transition diagram of FIG. 5 elapses after the optical transceiver 110 enters state 2, the optical transceiver 110 changes the state thereof into state 3. Consequently, transmission of the standby signal is suspended and recovery work itself is suspended. The optical transceiver 110 suspends transmission during a certain period of time T2. Thereafter, the optical transceiver 110 returns to state 2 and transmits the standby signal. However, since the delay has occurred in the transmission transponder 14, if the optical transceiver 110 cannot receive the data signal during the period of time T1, the optical transceiver 110 reenters state 3. Transmission of the standby signal is suspended. The optical transceiver 110 repeats the same actions and falls into a loop state in which state 2 and state 3 are repeatedly alternated. Eventually, it becomes impossible to recover the optical transceiver 110 after rebooting.

A delay occurring in a transponder is attributable partly to a startup time required by the transponder. Although no signal input has been detected in the transponder so far, if production of a signal input is initiated, the internal circuit of the transponder must be started in order to provide a signal output. This causes a delay. Moreover, when the transponder is recovered from the no-signal state, if human manipulations are required, a delay time is naturally produced until a worker autonomously performs recovery work. If a slow-start facility that does not abruptly transmit a large-power signal but increases power little by little is included, a delay occurs for a period of time required until the power is increased to the level permitting a receiver to recognize the signal.

Conventionally, optical transceivers, transponders, pieces of wavelength-division multiplexing transmission equipment, and opposed stations included in a WDM system are manufactured by the same manufacturer. However, as far as Ethernet-based wavelength-division multiplexing transmission is concerned, if the transponders and pieces of wavelength-division multiplexing transmission equipment are manufactured by the same manufacturer, the wavelength-division multiplexing transmission equipment manufacturer is requested to provide a product to which diverse optical transceivers manufactured by numerous manufacturers can be connected.

As described in the Japanese Unexamined Patent Application Publication No. 2001-217778, whichever of a method employing as a standby signal a signal (short pulse train) whose duty factor is small and a method employing a signal whose level or power itself is low is adopted, unless transponders support the method, recovery from a fault is impossible. FIG. 8 shows a sequence to be followed when an optical transceiver is rebooted. When the optical transceiver 110 is rebooted, the optical transceiver 120 opposite to optical transceiver 110 detects a fault, changes states from state 0 to state 1, and transmits a fault detection signal to the optical transceiver 110. When the rebooting of the optical transceiver 110 is completed, the optical transceiver 110 receives the fault detection signal transferred from the opposite transmitter, enters state 2, and transmits a standby signal to the optical transceiver 120. Although the transmission transponder 114 receives the standby signal, if the transmission transponder 114 does not transmit the standby signal but intercepts transfer of the standby signal, a data signal is not returned to the optical transceiver 110. Even in this case, after a period of time T1 elapses, the optical transceiver 110 changes the state thereof into state 3, and suspends transmission of the standby signal. After a period of time T2 elapses, the optical transceiver returns to state 2 and resumes transmission of the standby signal. If the transmission transponder 114 intercepts transfer of the standby signal, the optical transceiver 110 reenters state 3. Likewise, the optical transceiver 110 falls into a loop state in which state 3 and state 2 are repeatedly alternated, and is not recovered from a fault.

The phenomenon that the transmission transponder 113 intercepts transfer of a standby signal takes place in a case where although a signal (short pulse train) whose duty factor is small or a signal whose level or power itself is low is adopted as the standby signal to be transmitted from the optical transceiver 110, the transmission transponder 114 does not support the special standby signal and does not therefore recognize a received signal as an effective signal. In particular, if a special signal unique to a manufacturer of an optical transceiver is adopted as the standby signal, the transponder cannot deal with the signal.

In order to solve the foregoing problem attributable to the interaction between the fault notification facility included in a transceiver and signal processing performed in a transponder, the fault notification facility of the transceiver must be improved and the signal delay occurring in the transponder must be overcome. Otherwise, the problem is solved by temporarily invalidating the fault notification facility itself. However, if the optical transceiver has already been incorporated in a router or optical transmission equipment, upgrading of the optical transceiver or modification of settings is often hard to do. Moreover, in an equipment installation site or the like, there is difficulty in modifying settings for lack of a satisfactory equipment setting environment or equipment setting data. These cases cannot be coped with by updating the optical transceiver or transponder.

SUMMARY OF INVENTION

An object of the present invention is to provide optical transmission equipment permitting a transceiver, which has a fault notification facility, to recover from a fault even when the transceiver is connected to the optical transmission equipment.

In bidirectional transmission, a photoreceiver that monitors the intensity of an optical signal sent over a first transmission line, and an output adjuster disposed on a path of the optical signal sent from an optical transceiver over a second transmission line are used to decrease the power level of the optical signal to transmitted over the second transmission line when the intensity of the received optical signal decreases to become lower than a predetermined intensity.

BRIEF DESCRIPTION OF THE SEVERAL VIEWS OF DRAWING

FIG. 2 shows an explanatory diagram concerning actions to be performed in case a fault occurs in the conventional bidirectional optical transmission system.

DETAILED DESCRIPTION

Figure 1:
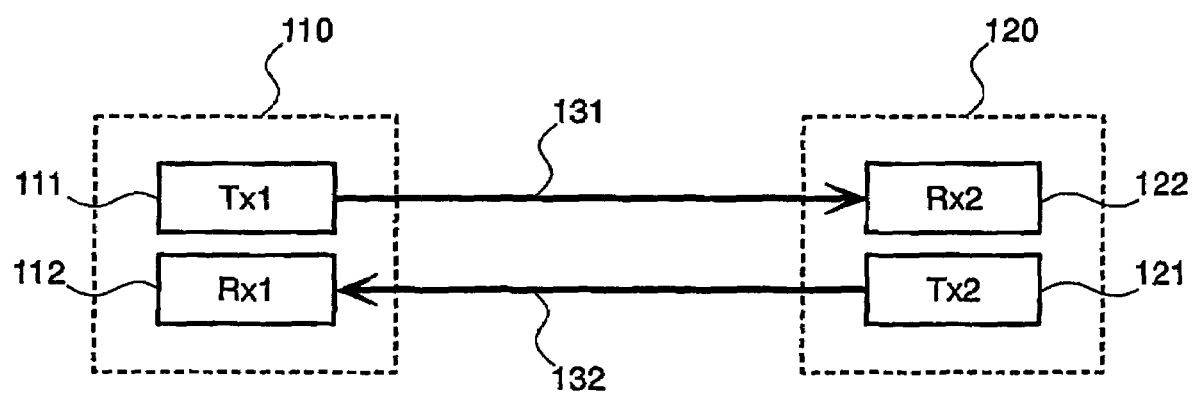
FIG. 1 shows a block diagram illustrating a conventional bidirectional optical transmission system.

Before beginning a detailed description of the subject invention, mention of the following is in order. When appropriate, like reference numerals and characters may be used to designate identical, corresponding or similar components in differing figure drawings. Arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/excessive detail. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Referring to drawings, a mode for implementing the present invention will be described below by presenting embodiments.

Figure 9:
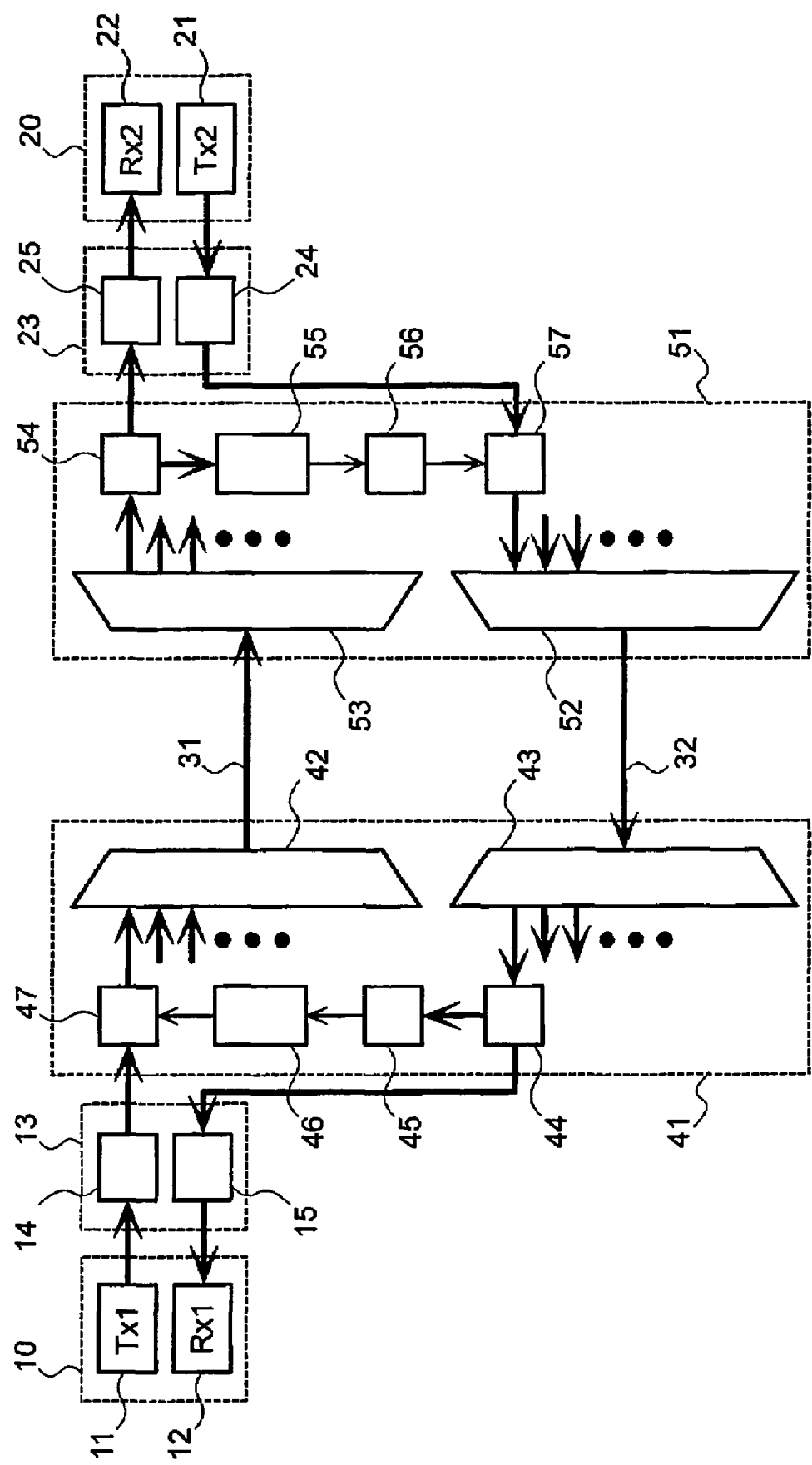
FIG. 9 shows a block diagram of a wavelength-division multiplexing system explanatory of an embodiment of the present invention.
Figure 10:
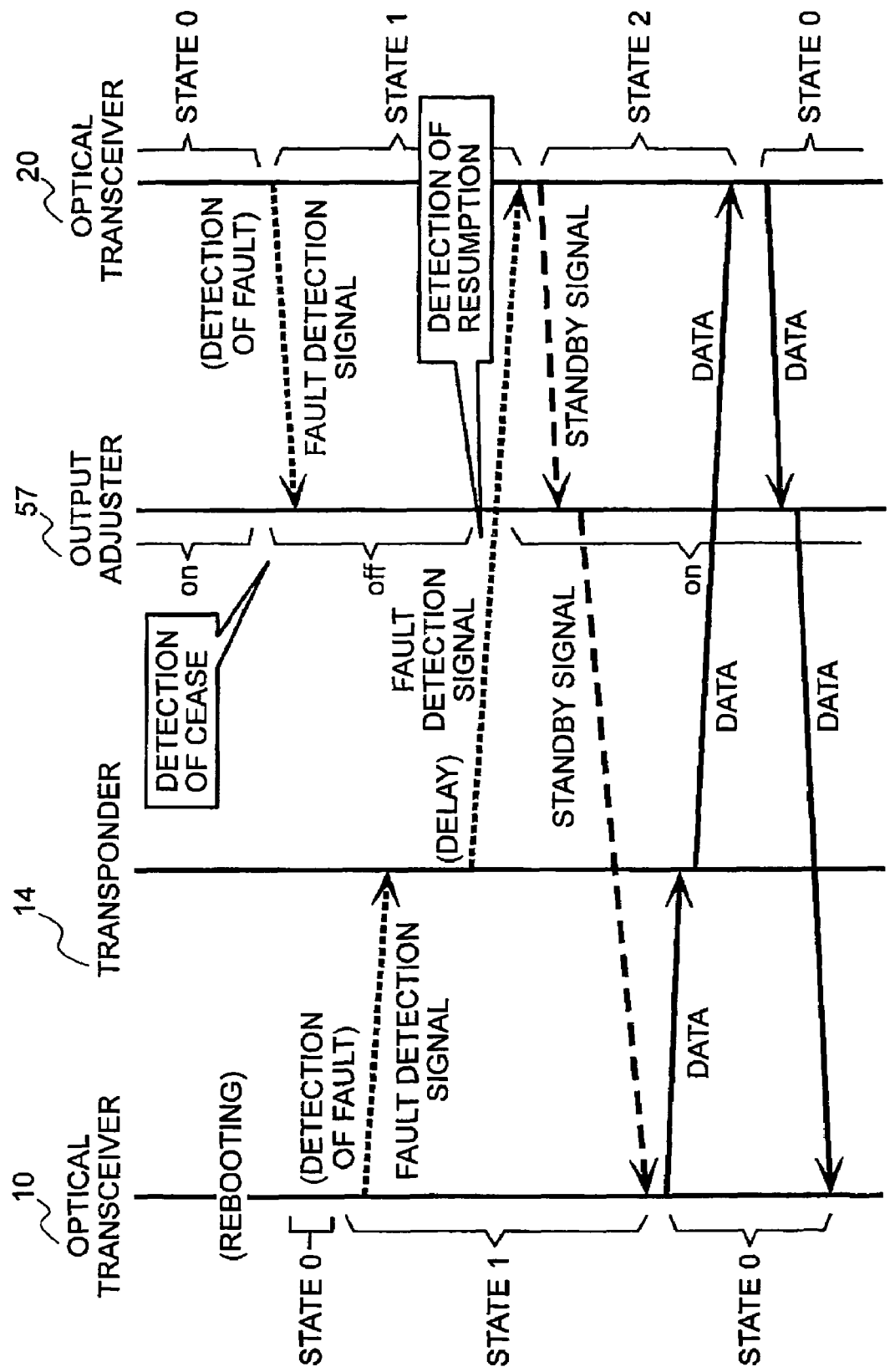
FIG. 10 shows a sequence diagram showing a sequence to be followed by the fault notification facility included in the optical transceiver and being explanatory of the embodiment of FIG. 9.
Figure 11:
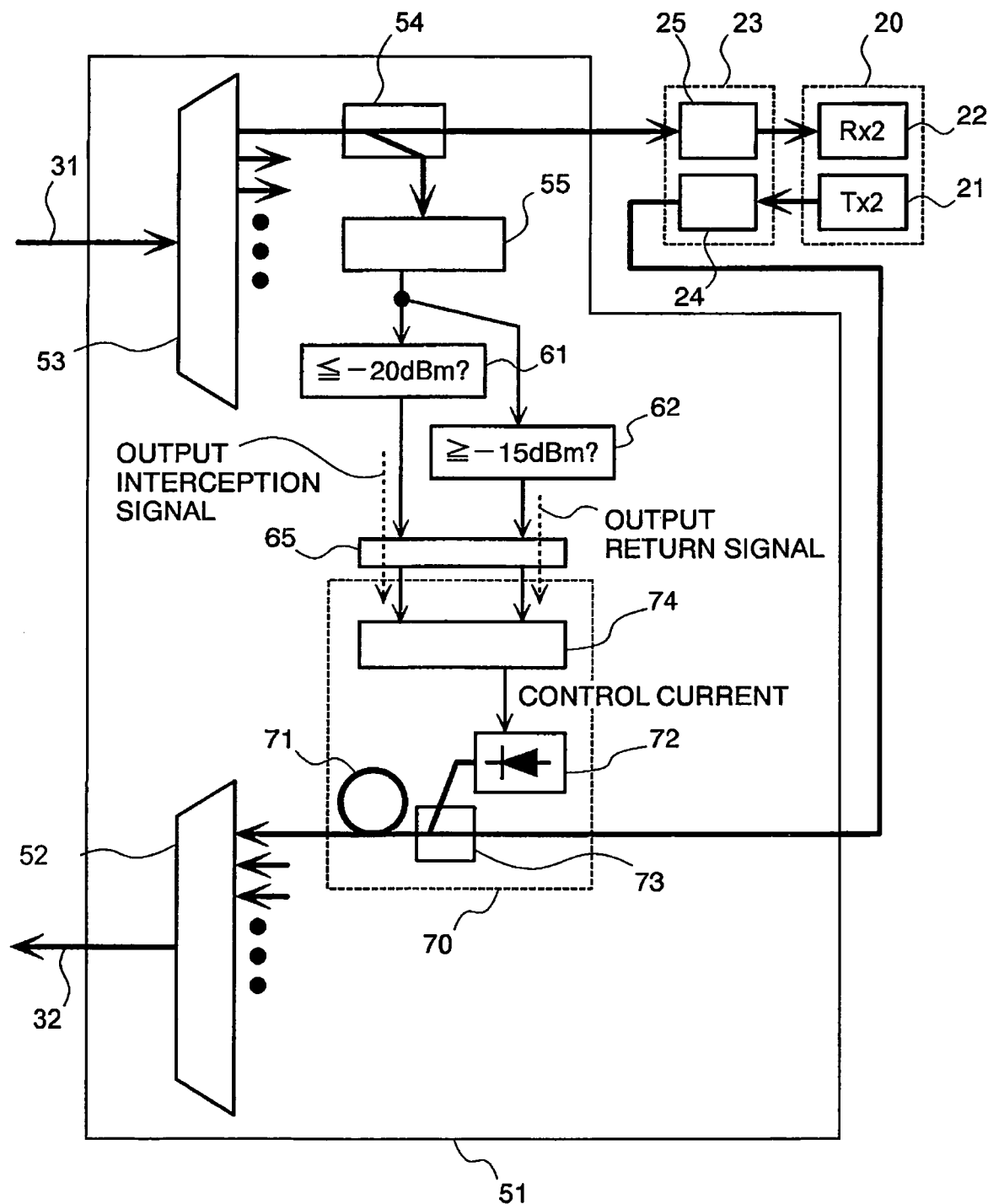
FIG. 11 shows a block diagram of wavelength-division multiplexing equipment explanatory of the embodiment of FIG. 9.
Figure 12:
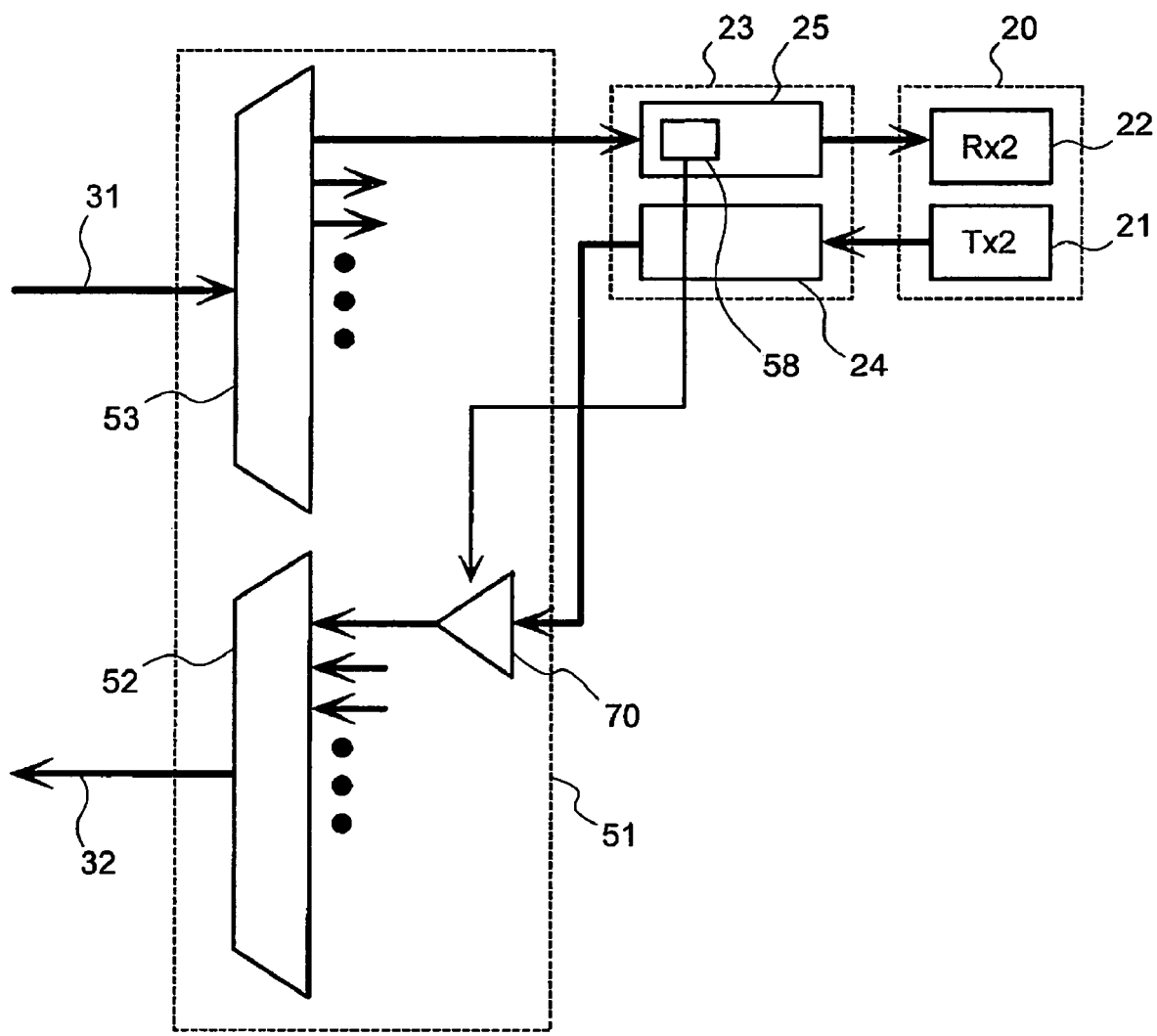
FIG. 12 shows a block diagram of wavelength-division multiplexing transmission equipment explanatory of another embodiment of the present invention.

An embodiment of the present invention will be described in conjunction with FIG. 9 to FIG. 12. FIG. 9 is a block diagram of a wavelength-division multiplexing system explanatory of the embodiment. FIG. 10 is an explanatory diagram of the embodiment showing a sequence to be followed by a fault notification facility included in an optical transceiver. FIG. 11 is a block diagram of a wavelength-division multiplexing transmission equipment explanatory of the embodiment. FIG. 12 is a block diagram of wavelength-division multiplexing transmission equipment explanatory of a variant embodiment.

Referring to FIG. 9, an optical signal sent from an optical transmitter 11 included in an optical transceiver 10 is temporarily transferred to a transmission transponder 14 included in a transponder 13. The transmission transponder 14 converts the wavelength of the optical signal into any of wavelengths managed in the form of a grid (in the order of nanometers) and supported by wavelength-division multiplexing transmission equipment. The resultant optical signal is supplied to a multiplexer 42 via an output adjuster 47 included in wavelength-division multiplexing transmission equipment 41, and is combined with an other signal to produce a wavelength-multiplexed signal. The wavelength-multiplexed signal propagates along an optical fiber 31, and then reaches a demultiplexer 53 included in wavelength-division multiplexing transmission equipment 51. The wavelength-multiplexed signal is separated into signals of different wavelengths, and then transferred to a reception transponder 25 included in a transponder 23. After the resultant signals are converted into signals supported by an optical transceiver, they are received by an optical receiver 22 included in an optical transceiver 20. Moreover, part of the signals separated by the demultiplexer 53 is branched out by a photocoupler 54 and routed to a photoreceiver 55.

On the opposite side of the system, an optical signal sent from an optical transmitter 21 is transferred to a transmission transponder 24. The transmission transponder 24 converts the wavelength of the optical signal to any of wavelengths managed in the form of a grid, and transfers the resultant optical signal to the wavelength-division multiplexing transmission equipment 51. Herein, the transmitted signal reaches an optical multiplexer 52 via an output adjuster 57. The signal is then combined with an other signal to produce a wavelength-multiplexed signal. The wavelength-multiplexed signal propagates along an optical fiber 32 and reaches a demultiplexer 43. The wavelength-multiplexed signal is then separated into signals of different wavelengths. The separated optical signals are transferred to a reception transponder 15 and converted into signals supported by an optical transceiver. The resultant signals are received by the optical receiver 12.

An electrical signal sent from the photoreceiver 55 is transferred to an input check circuit 56. The input check circuit 56 checks the electrical signal to see if the optical power level agrees with a certain value. If the optical power level is equal to or smaller than a certain reference value, the output adjuster 57 is controlled in order to intercept an optical signal to be transmitted. The description of a photocoupler 44, a photoreceiver 45, and an input check circuit 46 included in the wavelength-division multiplexing transmission equipment 41 is omitted. The photocoupler 44, photoreceiver 45, and input check circuit 46 act in the same manner as the photocoupler 54, photoreceiver 55, and input check circuit 56 included in the wavelength-division multiplexing transmission equipment 51.

Both of the optical signal sent from the optical transmitter 11 and the optical signal sent from the transmission transponder 14 are continuous signal light. Therefore, some signal is transmitted even in a standby (idle) state, and signal light will never cease. The same applies to the optical signal sent from the other optical transmitter 21 and the optical signal sent from the transponder 24.

Figure 3:
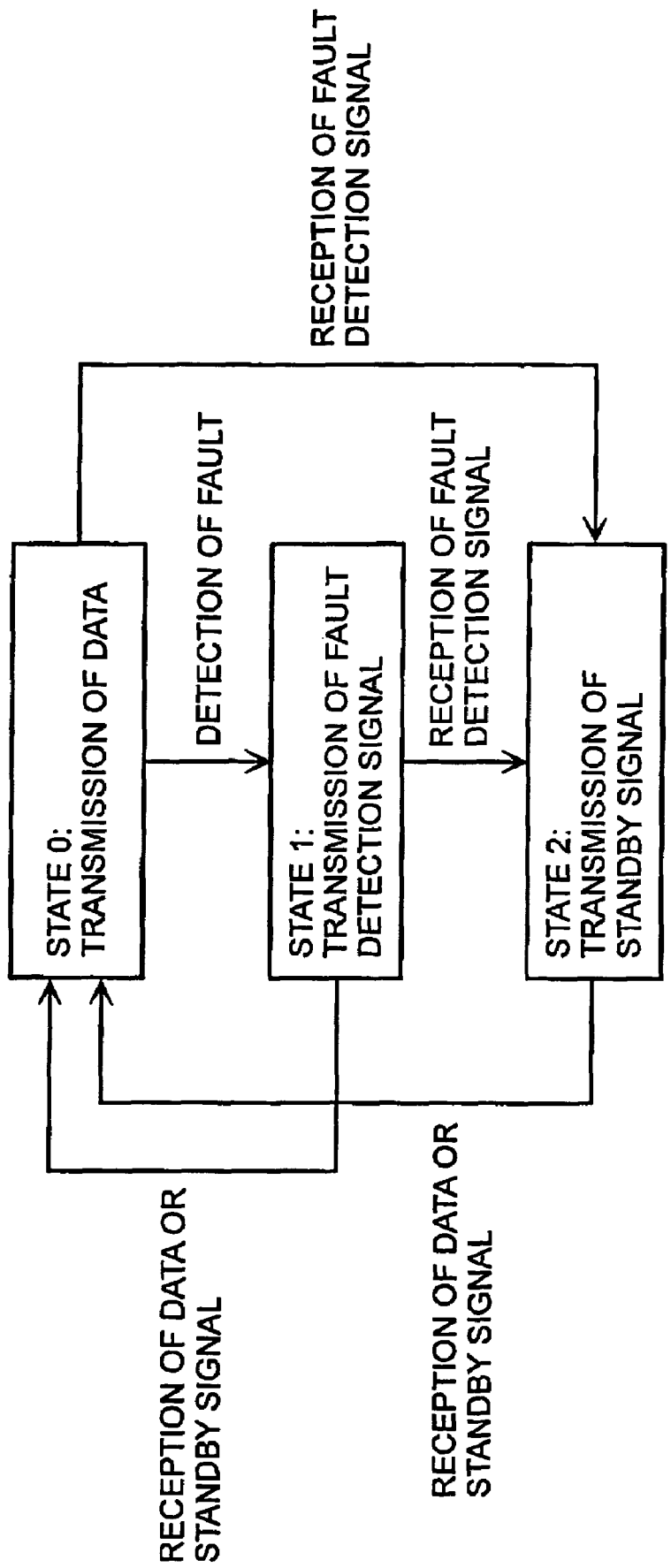
FIG. 3 shows a state transition diagram explanatory of a fault notification facility of a conventional optical transceiver.
Figure 4A:
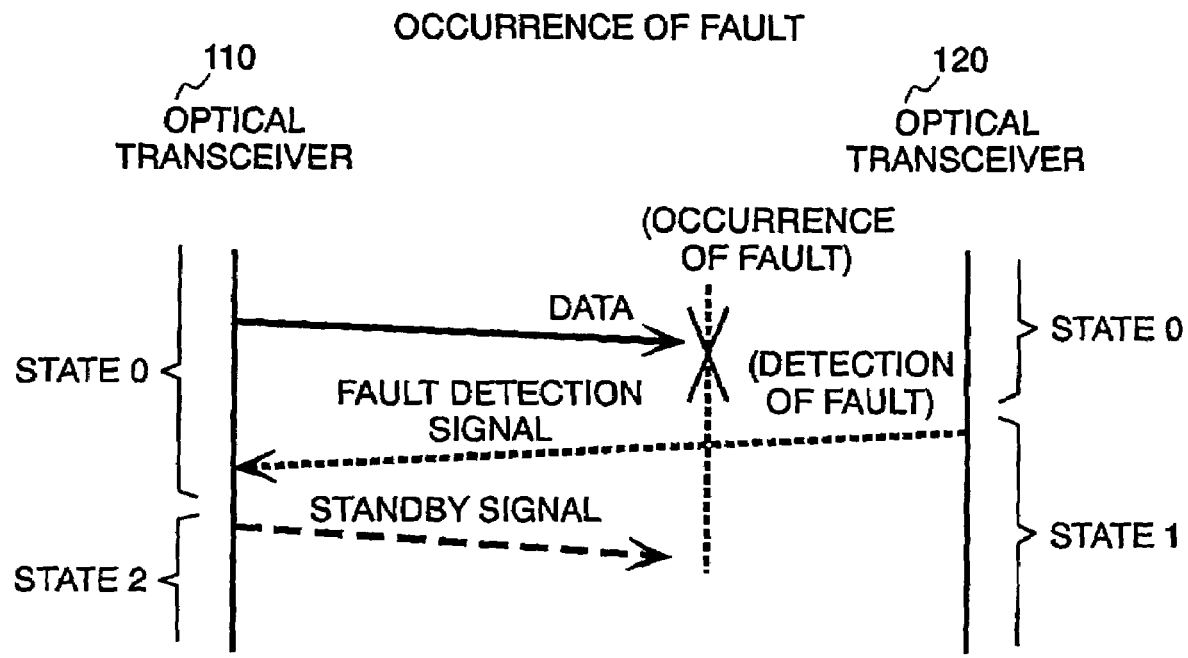
FIG. 4 shows a sequence diagram explanatory of the fault notification facility of the conventional optical transceiver.
Figure 4B:
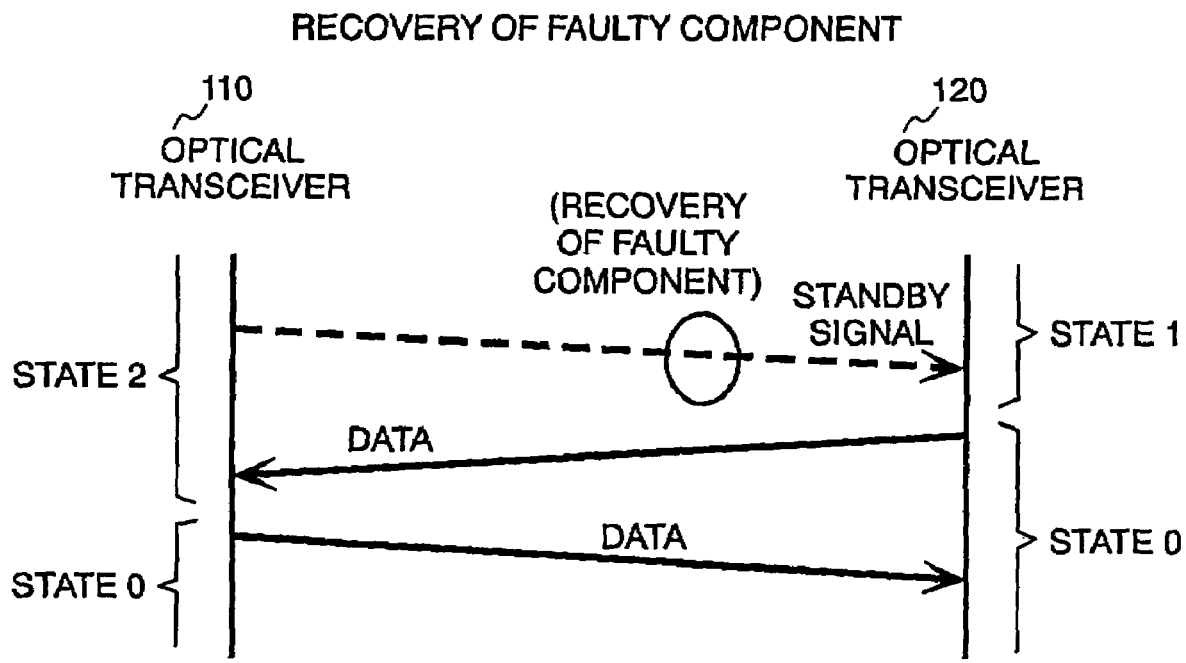
Figure 5:
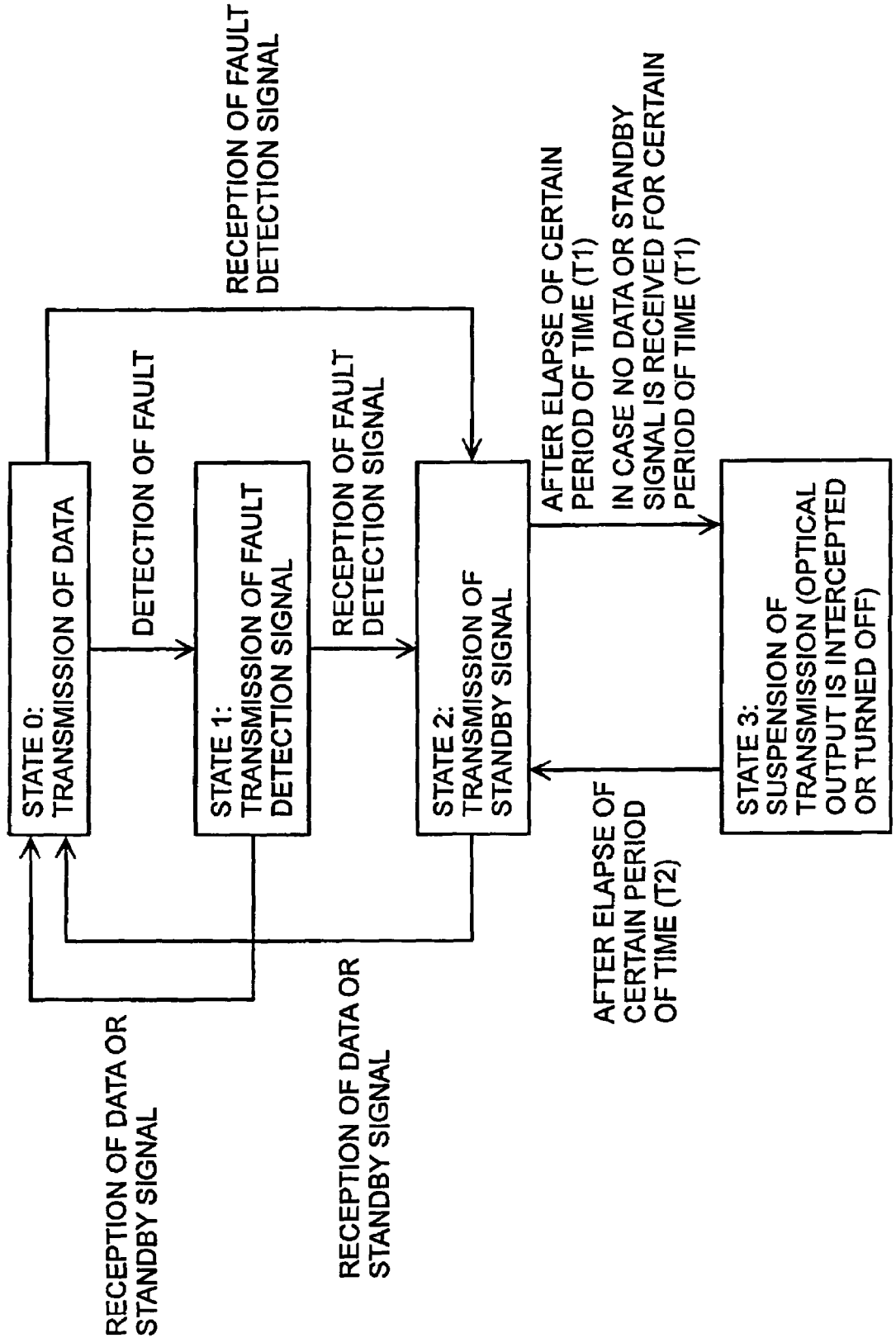
FIG. 5 shows a state transition diagram explanatory of other fault notification facility of the conventional optical transceiver.
Figure 6:
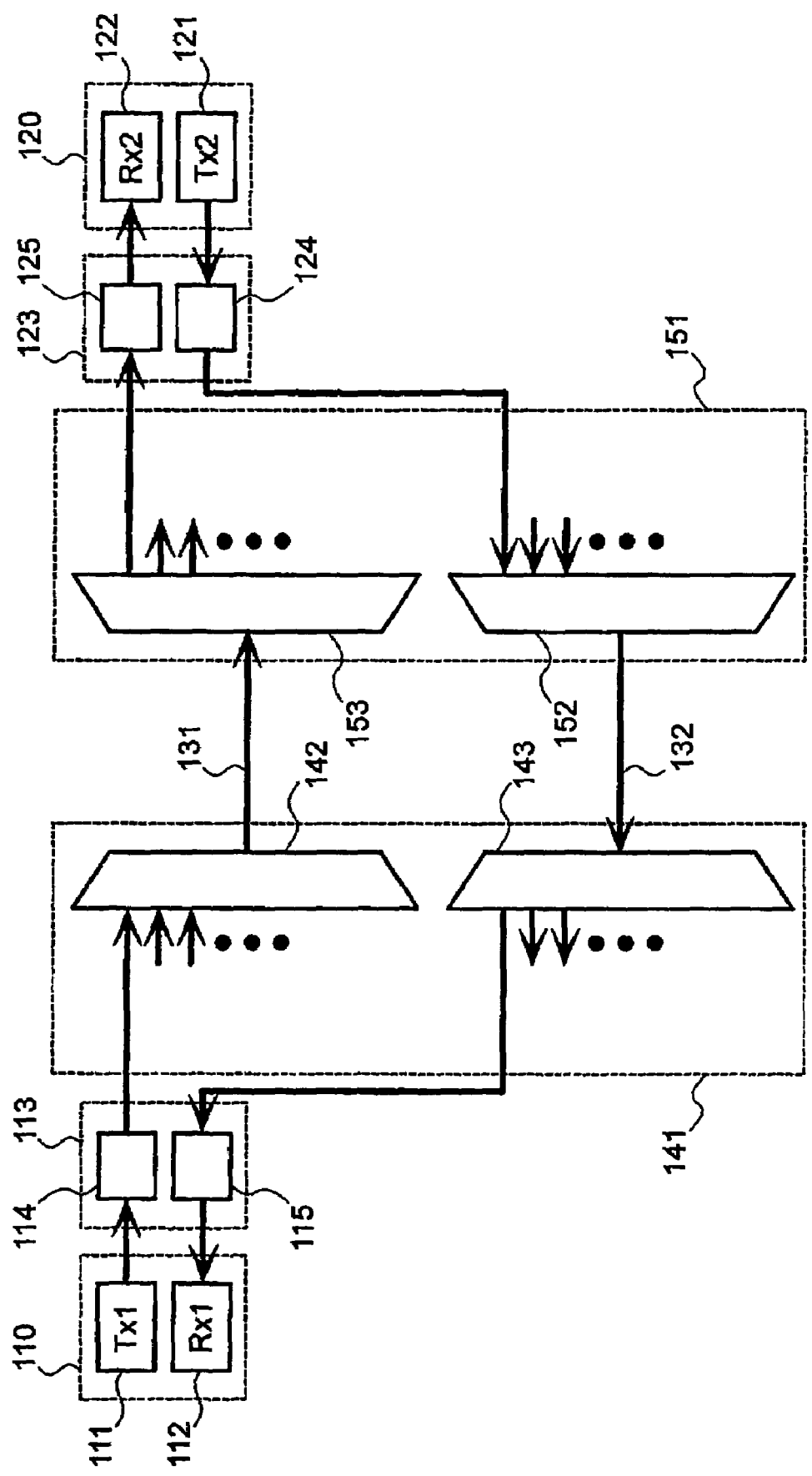
FIG. 6 shows a block diagram of a wavelength-division multiplexing system explanatory of an object of the present invention.
Figure 7:
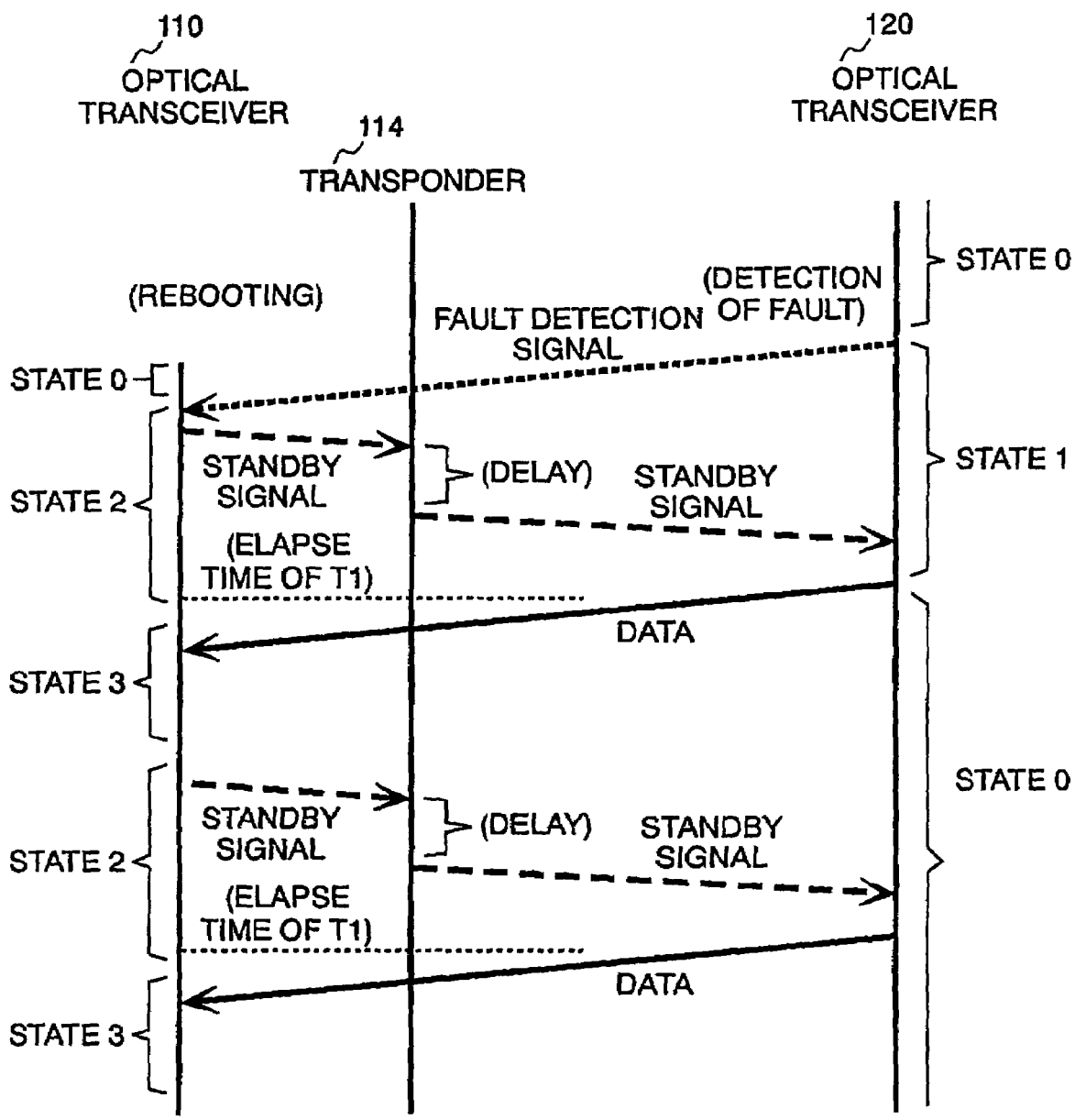
FIG. 7 shows a sequence diagram of a fault notification facility of an optical transceiver explanatory of the object.
Figure 8:
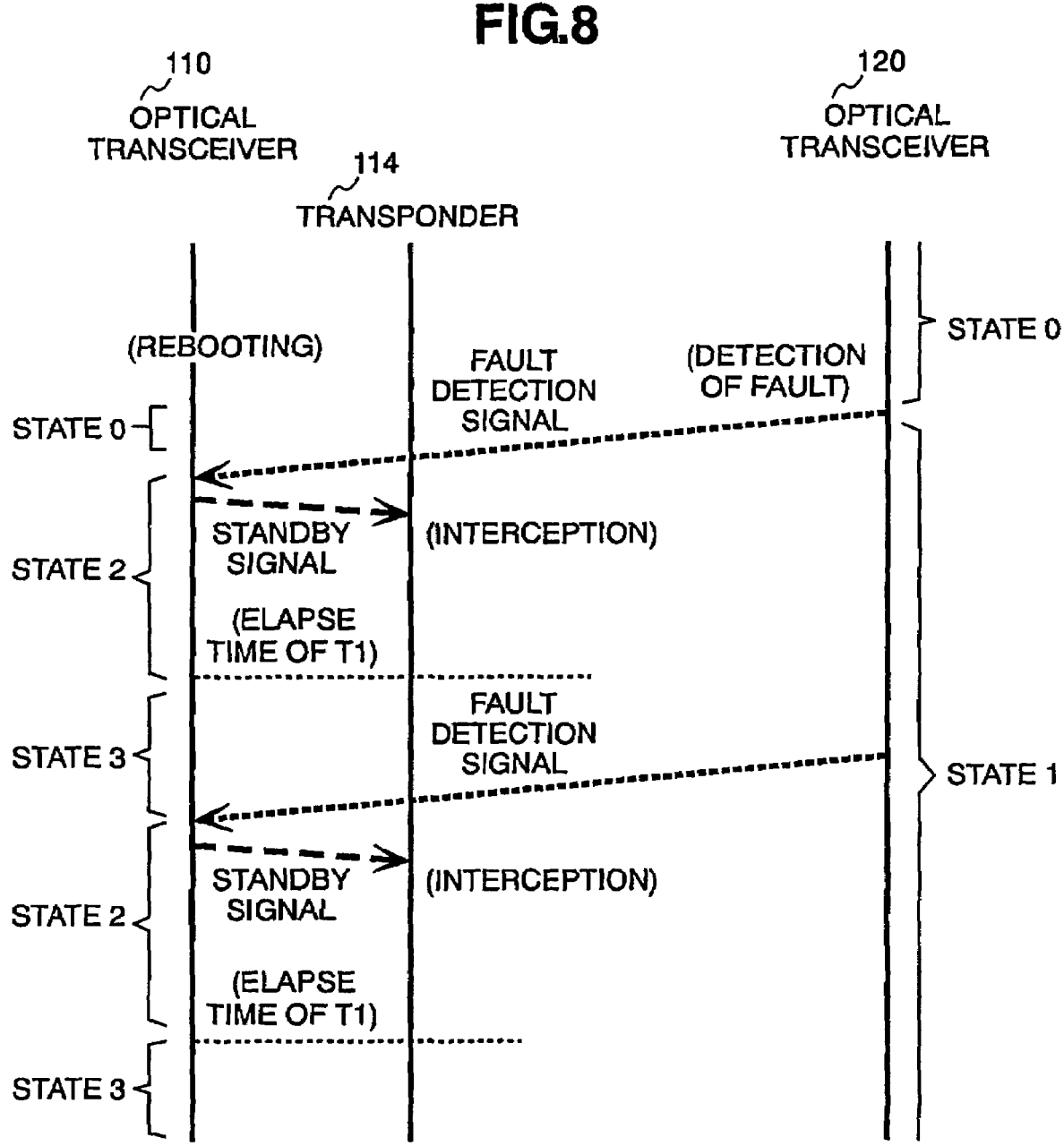
FIG. 8 shows a sequence diagram showing a sequence to be followed by the fault notification facility of the optical transceiver and being explanatory of the object.

FIG. 10 shows a sequence to be followed for rebooting when the optical transceiver 10 is supposed to perform fault notification according to the state transition diagram of FIG. 5 and the optical transceiver 20 is supposed to perform fault notification according to the state transition diagram of FIG. 3. FIG. 10 also shows the state of the output adjuster 57 interposed between the transmission transponder 24 and multiplexer 52. The illustration of the actions of the output adjuster 47 is omitted for brevity's sake.

When the optical transceiver 10 is rebooted, the optical transceiver 20 detects a fault, changes states from state 0 to state 1, and transmits a fault detection signal to the optical transceiver 10. When the optical transceiver 10 is rebooted, an input to the photoreceiver 55 ceases at the same time. The input check circuit 56 detects interception of an input. This causes the output adjuster 57 to change the state thereof into an output off state. Consequently, the fault detection signal sent from the optical transceiver 20 to the optical transceiver 10 is intercepted by the optical adjuster 57.

On the other hand, although the rebooting of the optical transceiver 10 is completed, a signal sent from an opposite transmitter is not detected. The optical transceiver 10 therefore enters state 1. Consequently, the optical transceiver 10 transmits a fault detection signal to the optical transceiver 20. After a delay occurs in the transponder, the fault detection signal reaches the optical transceiver 20. First, the photoreceiver 55 receives the fault detection signal, and the input check circuit 56 recognizes that input light is recovered. This causes the output adjuster 57 to change the state thereof into an output on state. When the fault detection signal reaches the optical transceiver 20, the optical transceiver 20 receives the fault detection signal. Consequently, the optical transceiver 20 changes the state thereof into state 2 and initiates transmission of a standby signal. Since the output adjuster 57 has already entered the output on state, the standby signal passes through the output adjuster 57 and heads for the optical transceiver 10.

At this time, the optical transceiver 10 is in state 1. Therefore, whichever of the transponders causes the fault detection signal or standby signal to delay, the optical transceiver 10 will not change the state thereof into state 3. When the optical transceiver 10 receives the standby signal from the optical transceiver 20, the optical transceiver 10 is reset to state 0. The reset optical transceiver 10 resumes data transfer. When a data signal reaches the optical transceiver 20, the optical transceiver 20 is also reset to state 0 and resumes data transfer. Thus, even when a delay occurs in a transponder, both the optical transceivers are recovered to a state in which they can transfer data.

According to the present embodiment, when a fault is defected on a link with an opposite Ethernet optical transceiver, control is implemented so that the opposite Ethernet optical transceiver will transmit a fault detection signal.

Incidentally, a response time constant (control time constant) required by the input check circuit 56 is determined to meet a condition that the interception performed by the output adjuster 57 should work so that the optical transceiver 10 having been rebooted immediately previously will not receive a fault detection signal. In consideration of the fact that signal light is not a burst signal but is continuous light, the interception may be a slow action that requires about several hundreds of milliseconds.

Referring to FIG. 11, the input check circuit and output adjuster shown in FIG. 9 will be explained in detail. The input check circuit comprises two comparators 61 and 62 and a functional mask circuit 65. The output adjuster is realized with an optical amplifier 70. The reason why the optical amplifier 70 is used to adjust an output is that compact optical amplifiers are disposed in association with wavelengths on the input stage of the wavelength-division multiplexing transmission equipment 51 in order to even the levels of the signals that have the wavelengths and are transferred to the demultiplexer 52 (output adjustment). The optical amplifier 70 is used for output adjustment. The optical amplifier 70 comprises an erbium doped optical fiber (EDF) 71, a pumping source 72 for supplying excitation light with which the EDF 71 is excited, a WDM coupler 73 for combining the excitation light with signal light sent from the transponder 24, and an optical amplifier control circuit 74 that feeds a control current to the pumping source 72.

The reason why the optical amplifier 70 can cause a signal output to go off or decay will be described. As long as sufficient power (for example, several tens of milliwatts) of excitation light is supplied to the EDF 71, the optical amplifier 70 amplifies signal light. However, when power of excitation light is not sufficiently supplied, a loss occurring when the light passes through the EDF 71 exceeds a gain to attenuate signal light. The present embodiment makes the most of this characteristic of the optical amplifier 70.

Referring back to FIG. 11, a monitor voltage proportional to optical power transferred to the photoreceiver 55 is transferred to the comparators 61 and 62. The comparator 61 compares the monitor voltage with a first reference voltage equivalent to an input of −20 dBm of the transponder 25. If the monitor voltage falls below the first reference voltage, the comparator 61 recognizes interception of a signal, and transmits an output interception signal to the optical amplifier control circuit 74. In response to the output interception signal, the optical amplifier control circuit 74 decreases an excitation current to be fed to the pumping source 72. Consequently, signal light sent from the transponder 24 is attenuated to have optical power, with which the opposite equipment recognizes interception of an output, by means of the optical amplifier 70.

The comparator 62 compares the monitor voltage with a second reference voltage equivalent to an input of −15 dBm of the transponder 25. If the monitor voltage exceeds the second reference voltage, the comparator 62 recognizes recovery from signal interception, and transmits an output return signal to the optical amplifier control circuit 74. In response to the output return signal, the optical amplifier control circuit increases an excitation current to be fed to the pumping source 72. Thus, the optical amplifier 70 performs output adjustment so that signal light sent from the transponder 24 will be provided as a predetermined optical output (for example, 0 dBm).

The functional mask circuit 65 is interposed between the comparators 61 and 62 and the optical amplifier control circuit 74. The functional mask circuit 65 can disable transmission of the output interception signal or output return signal to the optical amplifier control circuit. This is intended to eliminate the possibility that since the occasion on which the present embodiment is set to work is limited to the time of startup of the equipment or the time of troubleshooting, malfunction of the input check circuit adversely affects normal operation.

According to the present embodiment, there is provided wavelength-division multiplexing transmission equipment that permits a transceiver, which has a fault notification facility, to recover from a fault even when the transceiver is connected to the equipment.

The reason why the present embodiment includes two comparators is to stabilize the action of the input check circuit by differentiating a reference voltage based on which interception of a signal is recognized from a reference voltage based on which recovery of a signal is recognized. Alternatively, one comparator may be employed and reference voltages may be switched. Moreover, a fiber amplifier is adopted as the output adjuster. Alternatively, a semiconductor amplifier or a variable attenuator will do. Moreover, the circuit blocks have been described as if they are analog circuits. Alternatively, the functions of the circuit blocks may be realized with digital circuits or software controls.

Referring to FIG. 12, an embodiment slightly different from the foregoing embodiment will be described below. The present variant embodiment adopts an input check circuit 58, which is incorporated in the reception transponder 25, as a circuit that checks if there is an input from an opposite equipment.

In short, a transponder has a photoelectric conversion circuit and an electro-optic conversion circuit connected in series with each other. Consequently, a voltage level resulting from photoelectric conversion is used to discriminate interception of a signal from recovery of a signal. The transponder 25 includes the input check circuit 58 composed of the comparators 61 and 62 shown in FIG. 11 and, if necessary, the functional mask circuit 64. The input check circuit 58 and optical amplifier 70 are electrically connected to each other in order to transfer a control signal. The wavelength-division multiplexing transmission equipment and transponder are often installed in the same room, and the combination of the wavelength-division multiplexing transmission equipment and transponder may therefore be called the wavelength-division multiplexing transmission equipment.

According to the present invention, there is provided wavelength-division multiplexing transmission equipment permitting a transceiver, which has a fault notification facility, to recover from a fault even when the transceiver is connected to the equipment. The wavelength-division multiplexing transmission equipment directly monitors optical power of an input to a transponder, and can therefore check an event highly precisely. Moreover, the photocoupler and photoreceiver included in the wavelength-division multiplexing transmission equipment in accordance with the aforesaid embodiment are unnecessary.

Furthermore, even when the input check circuit is incorporated in the optical receiver 22 instead of the transponder 25, the present invention is applicable. Moreover, the input check circuit 58 may be included in the transponder 25. Both the input check circuit 58 and output adjuster 57 may be included in the transponder 25.

Except a case where the input check circuit 58 included in the reception transponder is used to check if an optical signal is transferred from opposite equipment, the presence of the reception transponders 25 and 15 shown in FIG. 9 is not a must. Even when the reception transponders 25 and 15 are not included, the present invention works without a problem.

A case where a signal whose duty factor is small (short pulse train) or a signal whose level or power itself is low is adopted as a standby signal to be sent to the optical transceiver 10 will be discussed below. Since the transmission transponder 14 does not support the special standby signal, if the special standby signal is intercepted, it is possible to recover equipment by applying the present invention. This is because, referring to the sequence diagram of FIG. 10, the optical transceiver 10 does not enter state 2 and does not therefore transmit a standby signal.

The aforesaid facility need not always be active. If a fault attributable to a unique fault notification facility of an optical transceiver or the input/output specifications for a transponder takes place, a faulty component must be recovered. In this case, the aforesaid facility can be validated automatically or temporarily validated through operation performed by an installation worker.

According to the present invention, there is provided optical transmission equipment permitting a transceiver, which has a fault notification facility, to recover from a fault even when the transceiver is connected to the optical transmission equipment.

The invention claimed is:

1. An optical transmission system, comprising:
    a first optical transmission apparatus for receiving a first wavelength-division multiplexing light as first optical signals of different wavelengths from a first optical transmission line and for transmitting a part of the first optical signals of different wavelengths contained in the first wavelength-division multiplexing light to a second optical transmission apparatus, and for receiving second optical signals of different wavelengths and for multiplexing the second optical signals for transmission to a second optical transmission line; and
    the second optical transmission apparatus for receiving one of the first optical signals of different wavelengths from the first optical transmission apparatus and for transmitting one of the second optical signals to the first optical transmission apparatus;
    wherein the second optical transmission apparatus monitors a power level of the one of the second optical signals and sends a result of the monitoring to the first optical transmission apparatus;
    wherein the first optical transmission apparatus intercepts the one of the second optical signals transmitted from the second optical transmission apparatus in dependence upon the result of monitoring;
    wherein the second optical transmission apparatus comprises:
        an input check unit for monitoring a power level of a signal from the second optical transmission apparatus and providing an output indicative thereof; and
    wherein the first optical transmission apparatus comprises:
        a demultiplexer for separating the first wavelength-division multiplexing light received from the first optical transmission line into first optical signals of different wavelengths to transmit one of the first optical signals to the second optical transmission apparatus;
        a multiplexer for multiplexing signals of different wavelengths received from the outside including the second optical transmission apparatus to transmit multiplexed signals to the second optical transmission line; and
        an output adjuster for intercepting a signal from the second optical transmission apparatus so as to inhibit receipt of the signal from the second transmission apparatus by the multiplexer depending on the output of the input check unit.

2. An optical transmission system according to claim 1, wherein the input check unit sends a signal indicative of a result of monitoring to the control unit.

3. An optical transmission system according to claim 2, wherein the input check unit compares the power level of the signal from the second optical transmission apparatus with a first predetermined value, and the output adjuster intercepts the signal from the second optical transmission apparatus when the power level of the signal from the second optical transmission apparatus is not greater than the first predetermined value as compared by the input check unit which provides a first output indicative thereof.

4. An optical transmission system according to claim 3, wherein:
    after the output adjuster intercepts the signal from the second optical transmission apparatus, the input check unit compares the power level of the signal from the second optical transmission apparatus with a second predetermined value, and the output adjuster stops intercepting the signal from the second optical transmission apparatus when the power level of the signal from the second optical transmission apparatus is not less than the second predetermined value as compared by the input check unit which provides a second output indicative thereof.

5. An optical transmission system according to claim 4, wherein the second predetermined value is a value which is larger than the first predetermined value.

6. An optical transmission system according to claim 3, wherein the output adjuster comprises:
    an optical fiber connected to the multiplexer;
    a pumping source for supplying excitation light to the optical fiber; and
    a control unit for controlling a power of the excitation light depending on the power level of the signal from the second optical transmission apparatus as compared by the input check unit.

7. An optical transmission system according to claim 1, wherein the second optical transmission apparatus is a transponder that converts a wavelength of a signal received from or transmitted to the first optical transmission apparatus.

* * * * *